Dec. 13, 1960 S. G. BEST 2,963,860
FUEL CONTROL MECHANISM
Filed July 7, 1958 3 Sheets-Sheet 1

INVENTOR
STANLEY G. BEST
BY Harris G. Luther
ATTORNEY

Dec. 13, 1960 S. G. BEST 2,963,860
FUEL CONTROL MECHANISM
Filed July 7, 1958 3 Sheets-Sheet 2

INVENTOR
STANLEY G. BEST
BY Harris G. Luther
ATTORNEY

Dec. 13, 1960     S. G. BEST     2,963,860
FUEL CONTROL MECHANISM
Filed July 7, 1958     3 Sheets-Sheet 3

INVENTOR
STANLEY G. BEST
BY Harris G. Luther
ATTORNEY

United States Patent Office 2,963,860
Patented Dec. 13, 1960

2,963,860

FUEL CONTROL MECHANISM

Stanley G. Best, Manchester, Conn., assignor to United Aircraft Corporation, East Hartford, Conn., a corporation of Delaware Filed July 7, 1958, Ser. No. 746,972

20 Claims. (Cl. 60—39.28)

This invention relates to turbine fuel control mechanism and in particular to mechanism for controlling fuel principally in accordance with speed at low powers and principally in accordance with temperature at high powers and in accordance with temperature during changes from one power setting to the other.

An object of the invention is mechanism which will give good turbine fuel control at low powers where temperature is generally constant over a large speed range and give good fuel control at high powers where temperature is critical and follows fuel flow closely and is subject to comparatively large changes with speed and to also give good acceleration control with limits on the maximum temperature during acceleration and limits on the minimum temperature during deceleration.

A further object is mechanism which will control fuel to accelerate the turbine from one speed to another and maintain a maximum permissible safe temperature during acceleration and quickly return the temperature to a selected temperature when the final speed is approached.

A further object is a fuel control mechanism in which the engine actual temperature signal is compared with a manually-selected, speed-responsive temperature signal, and an error signal is derived for controlling the fuel flow at the selected temperature.

A still further object is fuel control mechanism which will maintain acceleration at a maximum permissible temperature and deceleration at a minimum permissible temperature and return the control to a manually selected temperature upon completion of the acceleration or deceleration.

Other objects and advantages will be apparent from the following specification and the attached drawings in which.

In the control of some jet engines, it has been found desirable to use the engine temperature as a means for measuring fuel flow when the pilot's lever is fully advanced regardless of flight conditions. This temperature may be either turbine inlet or turbine discharge temperature. Primary temperature control presents two problems. One is at low powers where the temperature might be constant over a wide range of speeds or even rise with decreasing speeds so that large speed variations or statically unstable operation migh occur if temperature alone were used as the means for regulating the fuel flow. The other problem is that it is desired to operate the engine above the set temperature during periods of acceleration incident to advancing the pilot's lever. This higher temperature is preferably the maximum permissible safe temperature. When the engine has accelerated to its final speed, it is desired to reduce the temperature quickly back to the selected value. The problem is to determine when the engine speed has reached the desired final value at which the selected temperature should take control. The present invention provides a satisfactory means for solving both of the problems.

In general, temperature is controlled by comparing an actual temperature signal from the engine with a manually selected temperature, or datum, signal and utilizing the difference, or error signal, to control fuel flow to change the engine temperature and eliminate the error signal. The selected, or datum, signal is produced by combining a selected portion of a fixed electrical signal and a selected portion of a speed variable electrical signal to give a datum signal which is to be compared with the actual temperature signal. The proportions of fixed and speed variable signals are varied with pilot's lever position so that at low powers the speed signal will predominate and hence, the engine temperature will be compared primarily with a speed signal and the engine controlled in accordance with speed; that is, at low powers a speed signal is used as a datum signal with which to compare the actual engine temperature signal. Means are provided for limiting the maximum datum signal and also the minimum datum signal so that at low powers the datum signals would follow a curve such as shown by the lines 10, 12 and 14 of Fig. 3 as the turbine changes speed. The engine operating temperature is indicated by the curve 16 so that with the datum signal varying rapidly in accordance with speed, the engine will settle out at an operating condition indicated by the intersection 18 of the lines 12 and 16.

Figure 3:
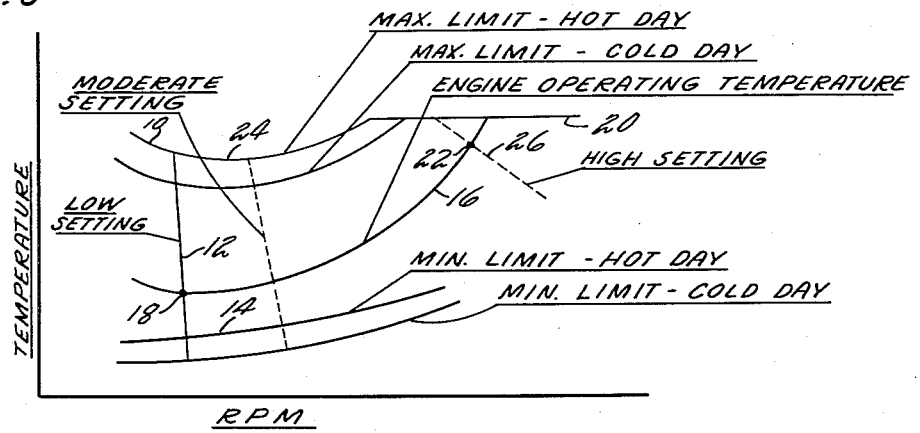
Fig. 3 is a set of curves showing operation of the fuel control.

At the high settings, the proportion of the speed signal utilized is greatly reduced and may even be eliminated so that the datum setting may be a fixed temperature value similar to that indicated by the line 20 of Fig. 3, or it could have a temperature variation with speed as indicated by line 26, smaller than the variation indicated by line 12 and the engine would settle out at an operating condition indicated by the intersection 22 of the lines 16 and 26. When the pilot's lever is shifted from a position indicated by the line 12 to a position indicated by the line 20, an increase of fuel flow is called for which will increase turbine operating temperature and the signal limiting rectifier then comes into play to limit the temperature in accordance with the line 24 so that the engine temperature will be limited to the maximum permissible while accelerating, but the temperature will be reduced or maintained at a constant selected value as the engine operating condition approaches the point 22. In a similar manner when the engine power is reduced by bringing the pilot's lever back to its low position, the minimum signal or temperature indicated by the line 14 will act as a datum and prevent a complete closing of the throttle valve and a consequent flame blowout and will maintain the engine temperature in accordance with line 14.

As the engine speed approaches the speed indicated by the line 12 from a higher speed, the datum signal which will then be influenced largely by speed will become large enough so as to increase the fuel flow to bring the temperature up from that indicated by line 14 to an operating condition indicated by the intersection 18.

From the above, it will be noted that steady state operation is established at the intersection of the selected, or datum, temperature curve with the curve of engine operating temperature. If the datum curve has a steep droop, such as indicated by the line 12, the intersection will occur as substantially constant speed regardless of shifts in the engine operating curve. If the droop curve is shallow, as indicated by line 20 or dotted line 26, the intersection will be at substantially constant temperature. The optimum slope may be somewhere in between, with a consequent reduction in the amount of turbine speed change from the low setting to the high setting where, it is felt, that the resulting lower speed at the high temperature and power is permissible. Stable operation is obtained at low speed as long as the droop of the line 12 is steeper than the downward slope of engine operating temperature versus speed as indicated by the line 16. During an acceleration induced by power lever movement from the low to a high pilot's lever setting, the turbine temperature immediately rises to the maximum permissible value and remains there until the speed has approached closer to the final value then settles back smoothly to the final operating point. During a deceleration, the reverse action takes place, the turbine temperature dropping to the minimum limit.

In general, the maximum temperature limit indicated by the line 24 would not be a constant or linear value, but would be appropriately varied with speed and compressor inlet air temperature as required to prevent surging of the engine compressor. The minimum limit would also be varied with speed and inlet temperature to prevent lean blowout on deceleration.

Figure 1:
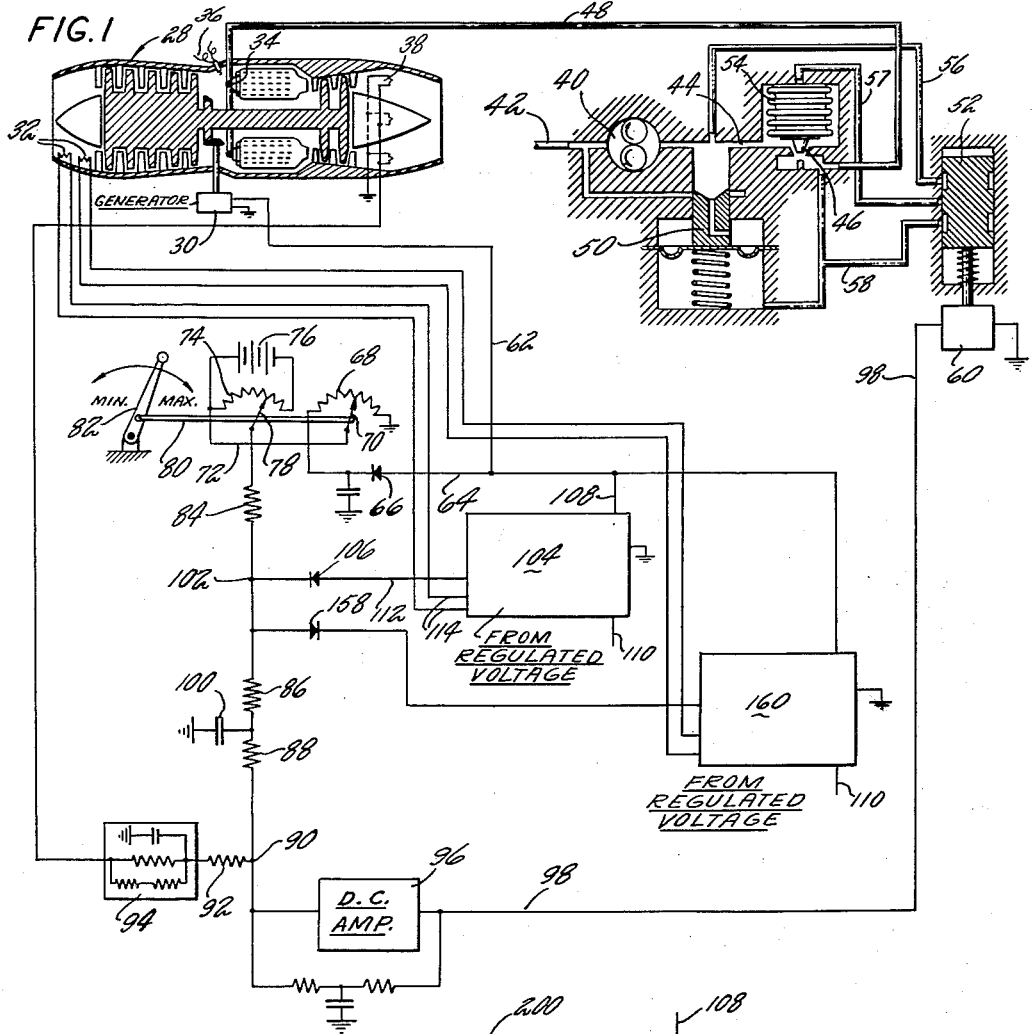
Fig. 1 is a schematic layout of a fuel control incorporating the invention.

Mechanism for accomplishing the above results is schematically shown in Fig. 1 in which a turbine-compressor 28 with the compressor inlet on the left-hand end and the turbine exhaust on the right-hand end of the engine as viewed in Fig. 1 is shown as driving a generator 30, and having compressor air inlet temperature responsive devices 32, fuel jets 34 and igniter 36 and turbine temperature sensing mechanism 38. Fuel is supplied to the jets or nozzle 34 by a pump 40 taking fuel through an inlet 42 from a supply not shown and delivering the fuel through a pipe 44 to a throttle valve 46 controlling the flow through a line 48 to the nozzles 34. A valve 50 responsive to the pressure on opposite sides of the throttle valve 46 controls a by-pass around the pump 40 to maintain constant the pressure drop across the throttle valve 46. Throttle valve 46 is positioned by a bellows 54 and a valve 52 which controls the pressure in bellows 54. A spring, not shown, but preferably located inside the bellows normally closes the valve 46. Valve 52 connects the interior of the bellows 54 through lines 56 and 57 with a pressure which is the same as the pressure outside of the bellows to permit the spring (not shown) to move the bellows toward a closed position and connects the interior of the bellows through lines 57 and 58 with a pressure less than the pressure outside of the bellows to overcome the effects of the spring and open the valve 46. The position of valve 52 is controlled by a proportional solenoid 60 similar to that shown and described in Best Patent 2,579,723. The proportional solenoid is actuated by an error signal brought in on line 98 from the sensing mechanism about to be described.

Generator 30 which is driven at a fixed ratio of the turbine-compressor speed may be a D.C. generator whose voltage output varies with speed, but is preferably an A.C. generator whose voltage varies with speed and whose output is rectified to give a D.C. signal. Generator 30 is connected through lines 62 and 64 and a rectifier 66 with a potentiometer 68. The convention used in connection with the rectifiers is that the current, as opposed to electrons, flows in the direction of the arrow so that as shown, the potentiometer 68 would be plus on the left-hand side and negative or zero on the ground side.

The wiper 70 of the potentiometer 68 is connected through line 72 with the positive side of the potentiometer 74 connected across a fixed source of voltage 76. Potentiometer 74 is provided with a wiper 78 which is connected by rod 80 with the wiper 70 of potentiometer 68 and with a pilot's lever 82 so that wipers 70 and 78 may be simultaneously actuated by movement of the pilot's lever. Wiper 78 is connected through resistances 84, 86 and 88 to a junction 90 which is also connected through resistance 92 and a reference junction compensator 94 with temperature sensing or tail pipe thermocouples 38. The signal produced at junction 90 is the error signal which is passed through a D.C. amplifier 96 and then through line 98 to the proportional solenoid 60 for controlling the fuel flow.

The tail pipe thermocouples 38 generate a positive D.C. voltage signal proportional to engine operating temperature, which signal after passing through resistor 92 is mixed with the temperature setting signal coming through resistor 88 to produce the error signal energizing proportional solenoid 60.

The positive side of the constant reference voltage 76 and potentiometer 74 are connected to ground through wiper 70 and potentiometer 68. Hence, the output of the potentiometer 74 through its wiper 78 will be a negative voltage with respect to arm 70. The circuit is arranged so that a negative voltage will call for more fuel and a higher temperature. That is, an increase in the negative voltage applied to resistor 88 will require a higher tail pipe temperature which will give a more positive voltage in resistor 92 in order to balance the increased negative voltage in 88 and produce a null signal at junction 90 which will de-energize solenoid 60, returning valve 52 to a neutral position and hold valve 54 in a fixed position calling for no fuel change. The output of the wiper 70 is a positive voltage with respect to ground which is proportional to the engine speed. The positive voltage from wiper 70 is added in series, in a bucking relation, to the output of the potentiometer 74 to give a temperature setting output of the wiper 78 which varies with respect to ground in a desired manner with speed. At high power settings of the pilot's lever 82, a small portion of generator voltage is selected so that speed has a minor effect and the voltage output of the potentiometers is a negative voltage determined largely by the fixed voltage source 76, thus giving a shallow droop characteristic to the line as indicated by line 26 of Fig. 3. At low power settings of the pilot's lever 82, a large portion of the generator voltage of the potentiometer 68 is selected so that the speed does most of the controlling, thus giving the steep droop to the temperature setting signal as indicated by line 12 of Fig. 3.

The condenser 100 is inserted between resistors 86 and 88 and connected with ground to introduce a lag in the setting signal, during changes produced by changing the pilot's lever 82, whose time constant would then be approximately equal to the time constant of the thermocouple 38 in order that the actual temperature rather than the indicated temperature will accurately follow the setting voltage appearing at junction 102.

Maximum and minimum limit scheduling circuits 104 and 160 are provided for limiting the maximum temperature scheduling signal and the minimum temperature scheduling signal to limit the maximum and minimum operating temperature of the engine. The maximum limiting circuit 104 is designed to provide an output voltage equal to the desired maximum limiting temperature setting voltage at point 102 and is varied in an appropriate manner with speed and ambient temperature to prevent surging. The output impedance of the circuit 104 must be low with respect to resistor 84. A rectifier 106 connects resistor 84 with the maximum limiting circuit 104. So long as the voltage at junction 102 represents a temperature setting below maximum, it will be positive with respect to the negative output of the limit scheduling circuit 104, and the rectifier 106 will be non-conducting so the circuit 104 will have no effect on the junction 102. However, if the voltage in wiper 78 entering resistor 84 is such as to attempt to produce a voltage at 102 more negative than established by limiter 104, the rectifier 106 will conduct, preventing the voltage at 102 from appreciably exceeding that set by the limit scheduling circuit 104.

Figure 2:
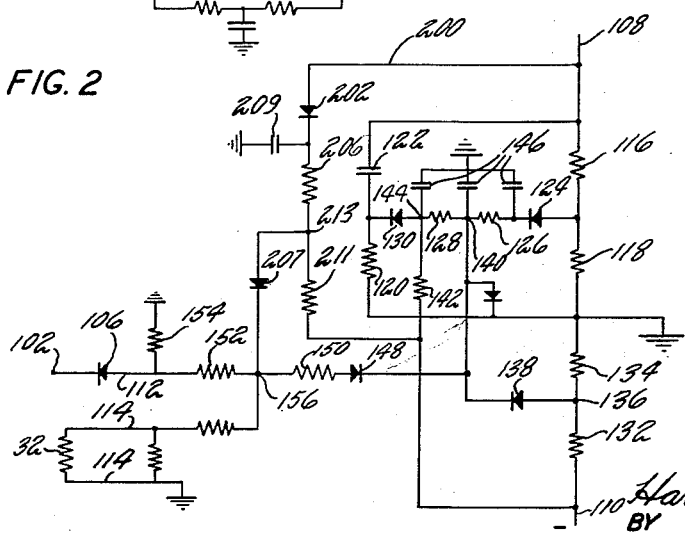
Fig. 2 is a detail showing the wiring arrangement of the limiting mechanism.

The limiting circuit 104 is shown in more detail in Fig 2 in which the exterior connections are arranged in a manner similar to that shown in Fig. 1. The A.C. generator signal is brought in on line 108; constant negative voltage from a voltage regulator tube (not shown) is brought in on line 110; the connection to the rectifier 106 is brought in on line 112; and the connections to the ambient temperature sensing mechanism 32 are brought in on lines 114. The voltage from the A.C. generator is put through a grounded bridge comprising resistors 116 and 118 on one side of the bridge and resistor 120 and condenser 122 on the other side of the bridge. The two sides of the bridge are connected by rectifier 124, resistors 126 and 128 and a second rectifier 130. The negative constant voltage source 110 is connected through a voltage divider 132 and 134 to ground. An intermediate point 136 of the voltage divider 132, 134 is connected through a rectifier 138 with the midpoint 140 of the bridge cross connection and the constant voltage source is also connected through a resistor 142 to the point 144 between resistor 128 and rectifier 130 on the bridge cross connection. Filtering condensers 146 are provided for the bridge cross connection.

In this limiter circuit so far described, the generator voltage which increases with speed is rectified to provide a positive voltage which is introduced to resistor 126. The generator voltage is passed through the circuit 120, 122 which will give it a faster rising characteristic than that introduced to rectifier 124, and is introduced to rectifier 130 tending to produce a negative voltage at junction 144 which will rise faster with increases in frequency of the generator voltage than the voltage introduced to resistor 126. However, the constant negative voltage from the constant voltage source 110 introduced to junction 144 initially is greater than the generator output introduced to rectifier 130 so that the rectifier will not conduct. Hence the voltage at junction 140 will be the negative voltage from the source 110 after passing through resistors 142, 128 reduced by the positive voltage coming through resistor 126 so that initially the numerical value of the negative voltage at junction 140 will decline with increasing speed to provide the downwardly sloping portion of limiting curve 24 of Fig. 3 at the lower speeds by reducing the negative bias in line 112 leading to limiting rectifier 106. As the speed increases, however, the generator voltage introduced to rectifier 130 will become greater than the constant voltage at 144 so that rectifier 130 will conduct and thus tend to increase the negative voltage at junction 144. This negative voltage, increasing faster with increases in speed than the positive voltage introduced to resistor 126 because of the better conduction of condenser 122 at higher frequencies, will increase the negative voltage at junction 140 with increases in speed and thus produce the rising portion of the curve 24 of Fig. 3 at the higher speeds. When the voltage at 140 reaches or exceeds the voltage at junction 136 in the constant voltage divider, rectifier 138 will conduct and thus limit the negative voltage obtainable and produce the line 20 of Fig. 3 which is substantially constant with changes in speed. The resultant negative voltage at junction 140 is led through a rectifier 148 and resistors 150, 152, 154 to ground. Resistors 150, 152 and 154 form a voltage divider from which the negative voltage from junction 140 applied to the backside of rectifier 106 is obtained. The voltage from the temperature sensing resistor 32 is fed into the junction 156 between resistors 150 and 152 to raise or lower the limits in accordance with ambient temperature by adding or subtracting from the voltage being fed from the junction 140. It will thus be apparent that the limiter 104 provides a voltage on one side of rectifier 106 at all times which will determine by conduction of rectifier 106 when the negative voltage at 102 exceeds the negative voltage in line 112 the maximum limiting temperature setting negative voltage at point 102 and which is varied in the appropriate manner with speed and temperature.

The minimum limiting circuit 160 is substantially the same as the limiting circuit 104, except that it provides a smaller voltage and the rectifier 158 is of reversed polarity which, with respect to rectifier 106, will conduct when the voltage introduced to resistor 142 attempts to operate point 102 at too low a temperature setting. This low temperature setting would, of course, be a voltage at 102. When rectifier 158 conducts, it will prevent the negative voltage at 102 from dropping to a numerical value below the limit set by the limit scheduling circuit 160.

The resulting negative voltage at 102 is the temperature setting. It is passed through resistors 86 and 88 and mixed with the positive thermocouple voltage passing through resistor 92. Zero error voltage results at the junction 90 when the turbine temperature is at the set value. A positive error voltage results if the turbine temperature is too high and a negative voltage if it is too low.

Condenser 100 introduces a lag in the setting whose time constant should be approximately equal to the thermocouple time constant in order that the actual turbine temperature, rather than that indicated by the thermocouple, will accurately follow the setting voltage at 102. For a steep increase in lever position, an overshoot of actual turbine temperature would otherwise occur if the indicated temperature introduced to junction 90 followed accurately the voltage at junction 102.

The error voltage at junction 90 is amplified in the D.C. amplifier 96 and applied through a line 98 to the proportional solenoid 60 in the fuel metering hydraulic system. Integral feedback in a degenerative sense is used around the amplifier to provide damping and to permit the use of higher sensitivity than would otherwise be possible.

Figure 5:
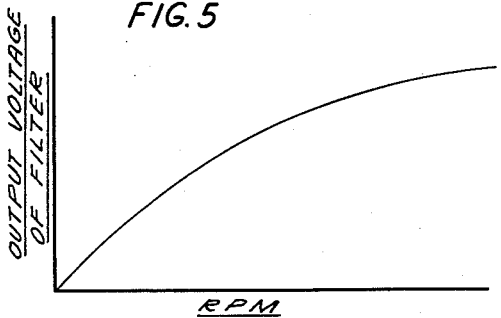
Fig. 5 is a curve showing the output of filter circuit of Fig. 4.
Figure 7:
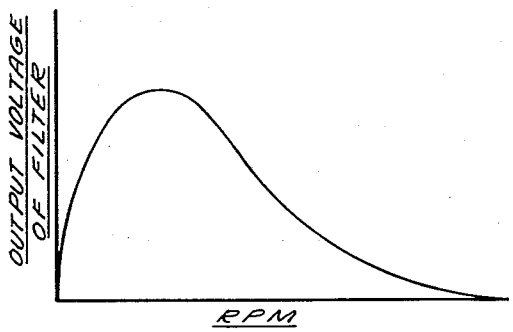
Fig. 7 is a curve showing the output of the filter circuit of Fig. 6.

While the potentiometer 68, selecting the desired proportion of the speed responsive voltage has been described as a preferred means of modifying the slope of curves 12 and 26 of Fig. 3, thus varying the slope of the droop with the speed, this droop change may be produced by other means. For instance, an alternator can be used with a filter circuit such that the A.C. output voltage of the filter varies with speed as shown by Figs. 5 and 7. Either type of curve can be used. In either case, the slope is steeper at moderate speed than at high speed. The output of the filter would be rectified to a positive D.C. voltage in the case of the curve of Fig. 5, or a negative voltage in the case of the curve of Fig. 7 which would be added directly to the voltage of the temperature setting potentiometer 74 and would be used in place of the droop slope adjusting potentiometer 68. The fixed voltage for the datum signal would be selected by the potentiometer 74, 78 and the value of speed voltage available to be combined with the fixed signal would vary automatically with speed. Due to the steeper slope at moderate speed, the speed would have a major effect at moderate speeds and little effect at high speeds.

Figure 4:
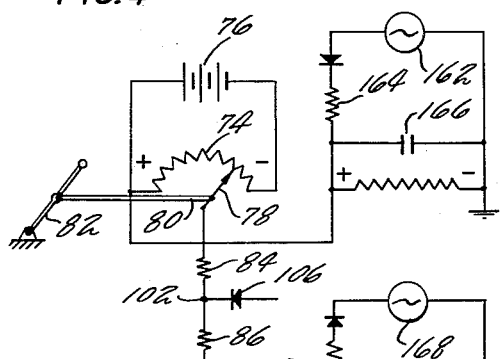
Fig. 4 is a diagram showing the output of an A.C. generator and filter circuits which can be used instead of manually actuated potentiometers to provide a speed-variable opposing voltage.
Figure 6:
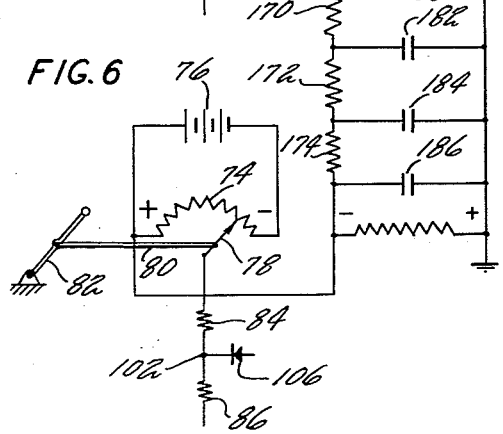
Fig. 6 is a diagram similar to Fig. 4 showing a filter circuit producing a different output.

Various filter circuits can be used for accomplishing these curves. Fig. 4 shows a simple example for producing the curve of Fig. 5 in which an alternator 162 has a load circuit of a resistor 164 and a condenser 166 and the output is taken across the condenser circuit. The filter circuit shown in Fig. 6 could be used for producing the curve of Fig. 7. This filter circuit comprises an alternator 168 with a series of resistors 170, 172, 174 in one side of the generator output with condensers 182, 184 and 186 connecting the several pairs of resistors with the output taken across the last condenser 186.

Figure 8:
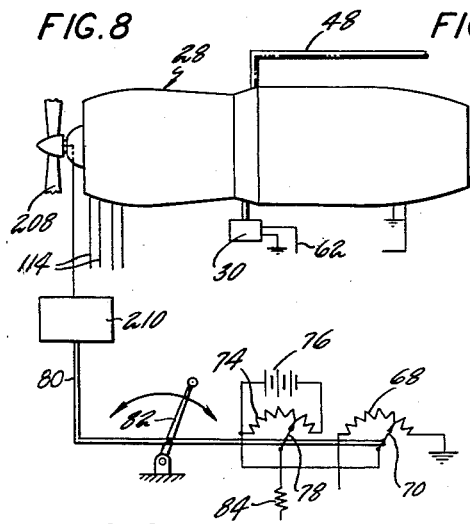
Fig. 8 is a schematic diagram showing the fuel control of Fig. 1 applied to a turbine driving an adjustable pitch propeller having a speed governor control.
Figure 9:
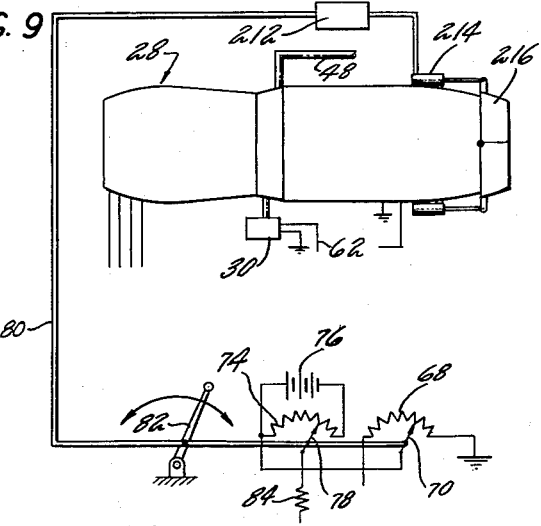
Fig. 9 is a schematic diagram showing the fuel control of Fig. 1 applied to a turbine having speed and thrust modifying exhaust nozzle regulating eyelids.

While this invention has been disclosed for use with a jet engine, it is usable as a fuel control for either propeller turbine engines or for engines having variable area exhaust nozzles as shown in Figs. 8 and 9. In connection with Fig. 8, a turbine engine 28 drives a propeller 208 and the turbine speed would be controlled by the propeller 208 by means of the usual propeller speed governor 210 which would provide an variable load for the turbine and thus control the speed. This speed could be set by adjusting the usual governor speeder spring by the same pilot's lever 82 as used to set the temperature. In this case, equilibrium operation would be established by varying the fuel valve to obtain equilibrium at the exact speed at which the propeller control is set rather than at the intersection of an engine operating curve wth a speed responsive temperature curve or a straight temperature curve. Thus the temperature signal would be selected by the potentiometers 68 and 74 in the manner described above and this signal combined with the actual measured engine temperature signal to provide a fuel control signal which would change the temperature but would not change the speed which would be held constant by the propeller. There would be no instability at low speeds because the speed would be substantially fixed and the temperature would respond readily to any changes in fuel flow.

For variable area exhaust nozzle engines shown in Fig. 9, the same type of control would be used except the speed would be controlled by a turbine speed responsive governor 212 controlling a variable area exhaust nozzle, the area being varied in the usual manner by a motor 214 actuating eyelids 216.

For both of these latter applications and even for the fixed area jet application on which the present detailed specification is based, it may be considered desirable to provide overspeed protection in the control i.e. provide protection against speeds above the normal speed range of the turbine. This can be done by arranging the maximum limiting scheduling circuit so that it cuts back with a rather steep slope, similar to that indicated by the dotted line 26 in Fig. 3, with increasing speed above a certain selected high speed, thus reducing the temperature setting to a low value. This may be done by connecting the output of the generator 30 through line 200, Fig. 2, with a rectifier 202, a resistor 206, and a second rectifier 207 with the junction 156 so as to add a positive voltage to reduce the negative voltage at the junction 156 and thus reduce the negative voltage in line 112 back of the rectifier 106. This will permit 106 to conduct and reduce the negative voltage at junction 102 and thus permit the positive voltage introduced to junction 90 from the thermocouple 38 to predominate and reduce the fuel flow and the engine speed. A condenser 209 may be inserted between the rectifier 202 and the resistor 206 to take out any ripple that may be left in the rectified voltage. A resistor 211 connects the negative constant voltage in line 110 with the junction 213 between the resistor 206 and the rectifier 207. Thus the fixed negative voltage in line 110 is compared with the positive rectified output of the generator 30 and will prevent the application of any positive biasing voltage from the generator 30 to the junction 156 until after the generator has attained a predetermined voltage indicating overspeed.

Figure 10:
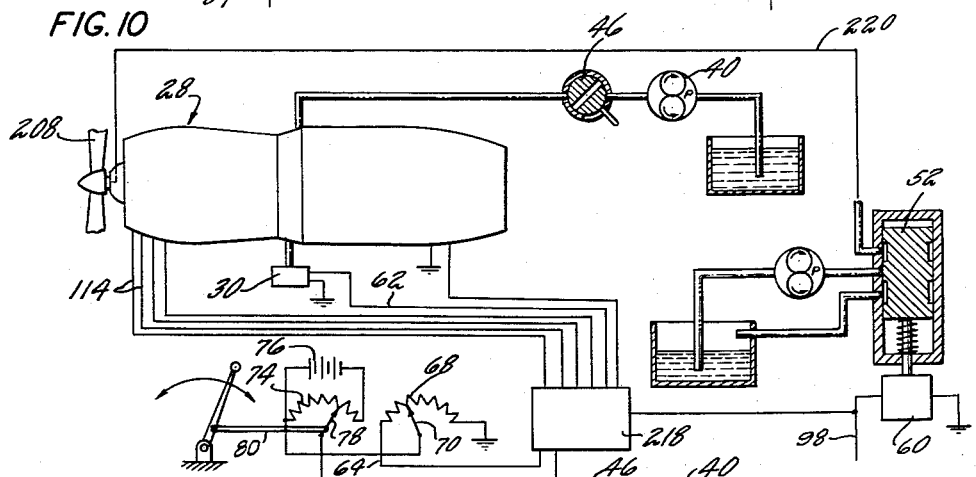
Fig. 10 is a schematic diagram showing the control of Fig. 1 utilized to control an adjustable pitch propeller with the fuel controlled by other means such as a manually actuated valve.
Figure 11:
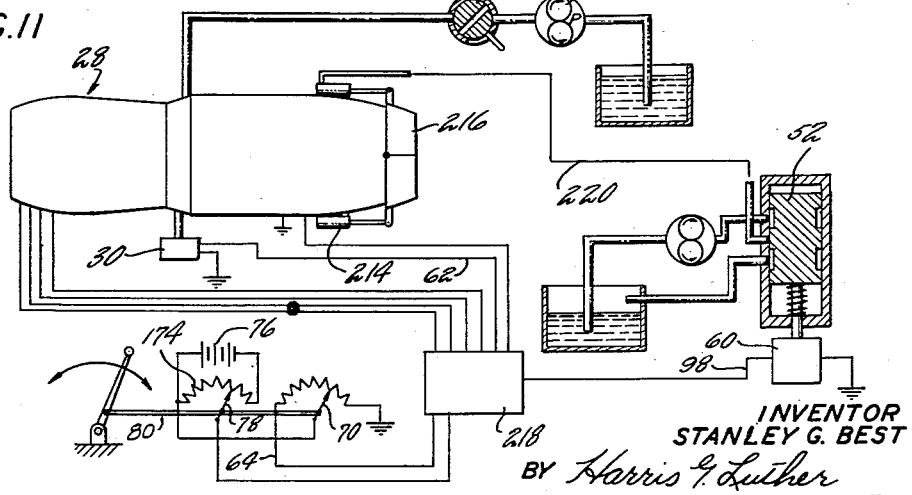
Fig. 11 is a schematic diagram showing the control of Fig. 1 applied to control the exhaust nozzle regulating eyelids with the fuel controlled by other means such as a manually actuated valve.

The same general control scheme can also be used as shown in Figs. 10 and 11, utilizing the propeller 208 or the variable area nozzle mechanisms 214, 216, to control the exact temperature instead of the speed in which case the propeller pitch or the nozzle area would be varied in accordance with a selected temperature. Mechanism such as solenoid 60 and valve 52 controlled by mechanism described in detail above and shown schematically at 218, could be used to control flow through pipe 220 leading to servo mechanism controlling the propeller pitch or the nozzle area. Although the servo mechanism has been shown as single acting, it will be understood that double acting mechanism could be used equally well. The fuel valve 46 would be controlled manually or by other suitable means and the fuel would be supplied to fuel line 48 by the usual pump 40 or other pressure source. The speed would then be established at the value where the droop curve of the fuel control passes through the temperature value set by the propeller or the area control. Rather steep droop lines would be used for that type of application to hold the speed within reasonably close limits as opposed to the shallow droop lines at high speed with the preferred embodiment described herein. This could be done by operating with the potentiometer slider 70 fixed or manually set to give nearly full generator voltage or the potentiometer 68 might be eliminated and the generator voltage applied directly to the lefthand end of potentiometer 74.

Although the preferred embodiments have been shown and described herein, it will be apparent that various changes and modifications may be made in the construction and arrangement of the various parts without departing from the scope of this novel concept.

I claim:

1. A control for a gas turbine comprising a power lever, means controlling turbine thrust, turbine temperature responsive means, turbine speed responsive means, means connecting said temperature responsive means and said speed responsive means with said thrust controlling means for controlling said thrust, and means actuated by said power lever selecting said temperature responsive means as the principal thrust controlling variable at high power settings of said power lever and said speed responsive means as the principal thrust controlling variable at low power settings.

2. A control as claimed in claim 1 including means actuated by said power lever gradually changing the relative proportions of temperature and speed as controlling variables between low and high powers.

3. A fuel control for a gas turbine comprising means producing a signal responsive to turbine speed, means combining said speed signal with a selected fixed signal to provide a combined signal, said combining means including means varying at least one of said signals to vary the proportion of the two signals in the combined signal and produce a relatively large speed signal at low powers and a relatively small speed signal at high powers, means producing a signal responsive to engine temperature, means comparing said combined signal with said temperature signal and producing an error signal, means metering fuel to said turbine in proportion to said error signal, means between said combining means and said comparing means limiting the minimum available value of said combined signals to limit the minimum turbine temperature.

4. In a fuel control for a gas turbine engine, valve means controlling the flow of fuel to the turbine engine, means producing a signal in accordance with turbine operating temperature, means producing a datum signal, valve positioning means comprising means comparing said turbine temperature signal with said datum signal, and means responsive to any difference in said signals for actuating said valve positioning means, means for adjusting said datum signal to provide different turbine powers, said adjusting means including means producing a speed signal responsive to turbine speed as a portion of said datum signal and means increasing the effectiveness of said speed signal on said datum signal at low powers and decreasing the effectiveness of said speed signal on said datum signal at high powers.

5. A control as claimed in claim 4 in which said adjusting means includes means varying the ratio of turbine speed to speed signal.

6. A control as claimed in claim 4 in which said speed signal is an electrical signal and said adjusting means includes a filter circuit varying the ratio of turbine speed to speed signal.

7. In a fuel control for a gas turbine engine, valve means controlling the flow of fuel to the turbine engine, means producing a signal in accordance with turbine operating temperature, means producing an electrical datum signal including a potentiometer connected across a source of fixed voltage and connected in series arrangement with the wiper of a second potentiometer which is connected with a source of voltage variable with speed, valve positioning means comprising means comparing said turbine temperature signal with said datum signal, and means responsive to any difference in said signals for actuating said valve positioning means, means for adjusting said datum signal to provide different turbine powers, said adjusting means including means producing a speed signal responsive to turbine speed as a portion of said datum signal and means increasing the effectiveness of said speed signal on said datum signal at low powers and decreasing the effectiveness of said speed signal on said datum signal at high powers.

8. A fuel control for a gas turbine comprising means for selecting the turbine operating temperature, including means for selecting a signal to be compared with an engine operating temperature signal to provide a temperature error signal, means responsive to said error signal controlling the fuel flow to said turbine in proportion to said error signal, said selecting means including a fixed signal, a signal varying with turbine speed, means combining said signals and means manually varying said fixed signal and simultaneously varying the proportion of said speed varying signal to be combined with said fixed signal to provide said selected signal.

9. A fuel control for a gas turbine comprising means producing a signal responsive to turbine speed, means combining said speed signal with a selected fixed signal to provide a combined signal, means for simultaneously manually decreasing one signal and increasing the other signal to vary the proportion of the two signals in the combined signal, means producing a signal responsive to turbine temperature, means combining said combined signal with said turbine temperature signal to provide an error signal, means metering fuel to said turbine in proportion to said error signal, means connected with said combined signal to limit the maximum value of said combined signal and means connected with said combined signal to limit the minimum value of said combined signal to thereby limit the maximum and minimum temperature.

10. A jet engine fuel valve control comprising means producing a temperature signal proportional to engine temperature, means producing a speed signal proportional to engine speed, means selecting a portion of said speed signal, means producing a steady signal, including means selecting a desired portion of a fixed signal, means combining said selected portion of said fixed signal with said selected portion of said speed signal to provide a datum signal, power control means actuating both said selecting means to vary said datum signal, means combining said datum signal with said temperature signal to produce an error signal and means responsive to said error signal actuating said fuel valve to vary the fuel flow and change the engine temperature and speed to eliminate said error signal.

11. A control as claimed in claim 10 in which the power control in moving to a low power position selects a large portion of the speed signal and a small portion of the fixed signal to combine to produce the datum signal.

12. A control as claimed in claim 10 in which the power control in moving to a high power position selects a small portion of the speed signal and a large portion of the fixed signal to combine to produce the datum signal.

13. In combination with an engine having an engine operating temperature substantially constant over a material speed range at the lower engine powers and increasing with speed at the higher engine powers, means producing a temperature signal in accordance with engine operating temperature, fuel control means including means establishing a datum signal, means combining said engine temperature signal and said datum signal to produce an error signal and means modifying fuel flow by said error signal to change the engine temperature and engine speed to eliminate said error signal, said datum signal establishing means including, means selecting the desired engine power and, at lower power positions including, means establishing a datum signal equivalent to the maximum permissible engine temperature below a selected engine speed, and speed responsive means effective, within a selected minor engine speed range above said selected speed, to reduce said datum signal to a signal equivalent to the minimum permissible engine temperature and at the higher power setting positions including means establishing a signal equivalent to the maximum permissible engine temperature up to a selected temperature and maintaining said datum signal less subject to variations with speed to provide a signal more nearly equivalent to a selected temperature for a material change of higher speeds.

14. In combination with an engine having an engine operating temperature substantially constant over a material speed range at the lower engine powers and increasing with speed at the higher engine powers, means producing a temperature signal in accordance with engine operating temperature, fuel control means including means establishing a datum signal, means combining said engine temperature signal and said datum signal to produce an error signal and means modifying fuel flow by said error signal to change the engine temperature and engine speed to eliminate said error signal, and means selecting the desired engine power, said datum signal establishing means including means limiting the datum signal at one extreme to a signal representing the maximum permissible engine temperature, means limiting the datum signal at the other extreme to a signal representing the minimum permissible engine temperature, speed responsive means controlled by said power selecting means effective at the lower end of the engine power range within a selected minor engine speed range to control said datum signal between said maximum signal and said minimum signal and means controlled by said power selecting means effective at the upper end of the power range reducing the effect of speed on said datum signal.

15. In combination with an engine having an engine operating temperature substantially constant over a material speed range at the lower engine powers and increasing with speed at the higher engine powers, engine temperature responsive means producing an electrical signal proportional to engine temperature, means establishing an electrical datum signal, means combining said electrical signals to produce an electrical error signal proportional to the variation of said temperature signal from said datum signal, and fuel control means modifying fuel flow by said error signal to change engine temperature and speed to eliminate said error signal, means selecting the desired engine power by modifying the datum signal, said datum signal establishing means including a first rectifier having a predetermined bias limiting the datum signal at one extreme to a value representing the maximum permissible engine temperature, means responsive to speed varying the basis of said first rectifier to reduce the maximum temperature limit as speed increases from zero speed up to a selected higher speed and other speed responsive means varying said bias in the opposite direction above said selected speed to increase the maximum temperature limit as the turbine speed increases above said selected speed, and a second rectifier limiting the datum signal at the other extreme to a value representing the minimum permissible engine temperature, means producing an electrical signal responsive to speed, an electrical signal source of fixed value, means combining said speed responsive and said fixed electrical signals to produce said datum signal and means controlled by said power selecting means to select said speed responsive signal as the predominating signal at low power positions and said fixed signal as the predominating signal at high power positions.

16. A fuel control as claimed in claim 4 for a turbine driving a controllable pitch propeller, and including a governor driven by said turbine controlling the pitch of said propeller to maintain said turbine speed at selected values, governor setting means for selecting said values, and means connecting said governor setting means with said datum adjusting means.

17. A fuel control as claimed in claim 4 for a turbine having a variable area exhaust nozzle and including a governor driven by said turbine controlling said nozzle area to maintain said turbine speed at selected values, governor setting means for selecting said values and means connecting said governor setting means with said datum adjusting means.

18. A control for a gas turbine comprising means producing a signal responsive to turbine speed, means combining said speed signal with a selected fixed signal to provide a combined signal, said combining means including means varying at least one of said signals relative to the other to vary the proportion of the two signals in the combined signal, means producing a signal responsive to engine temperature, means comparing said combined signal with said temperature signal and producing an error signal, means varying the thrust of said turbine, means responsive to said error signal controlling said thrust varying means, means connected with said combining means between said combining means and said comparing means limiting the value of said combined signals to limit turbine temperature.

19. A control as claimed in claim 18 in which said turbine has a normal speed range and an overspeed range and including means responsive to speed varying the effect of said limiting means to vary the maximum temperature over the normal speed range and other means responsive to an overspeed of said turbine biasing said limiting means to reduce the available value of said combined signals.

20. In combination with an engine having an engine operating temperature substantially constant over a material speed range at the lower engine powers and increasing with speed at the higher engine powers, engine temperature responsive means producing an electrical signal proportional to engine temperature, means establishing an electrical datum signal, means combining said electrical signals to produce an electrical error signal proportional to the variation of said temperature signal from said datum signal, and fuel control means modifying fuel flow by said error signal to change engine temperature and speed to eliminate said error signal, means selecting the desired engine power by modifying the datum signal, said datum signal establishing means including a first rectifier having a predetermined bias limiting the datum signal at one extreme to a value representing the maximum permissible engine temperature, and a second rectifier limiting the datum signal at the other extreme to a value representing the minimum permissible engine temperature, means responsive to speed increase varying the bias of said first rectifier to reduce the maximum temperature limit from zero speed up to a selected higher speed and increase the maximum temperature limit as the turbine speed increases above said selected speed, a third rectifier limiting the bias of said first rectifier to a predetermined constant value, means producing an electrical signal responsive to speed, an electrical signal source of fixed value, means combining said speed responsive and said fixed electrical signals to produce said datum signal and means controlled by said power selecting means to select said speed responsive signal as the predominating signal at low power positions and said first signal as the predominating signal at high power positions.

References Cited in the file of this patent

UNITED STATES PATENTS

| | | |
|---|---|---|
| 2,688,842 | Oestrich | Sept. 14, 1954 |
| 2,764,867 | Farkas | Oct. 2, 1956 |
| 2,776,536 | Chudyk | Jan. 8, 1957 |
| 2,790,303 | Kutzler | Apr. 30, 1957 |
| 2,805,543 | Lawry et al. | Sept. 10, 1957 |
| 2,805,546 | Lawry et al. | Sept. 10, 1957 |
| 2,807,138 | Torell | Sept. 24, 1957 |
| 2,820,340 | Dolza et al. | Jan. 21, 1958 |

FOREIGN PATENTS

| | | |
|---|---|---|
| 1,146,614 | France | Nov. 13, 1957 |